Figure 1:
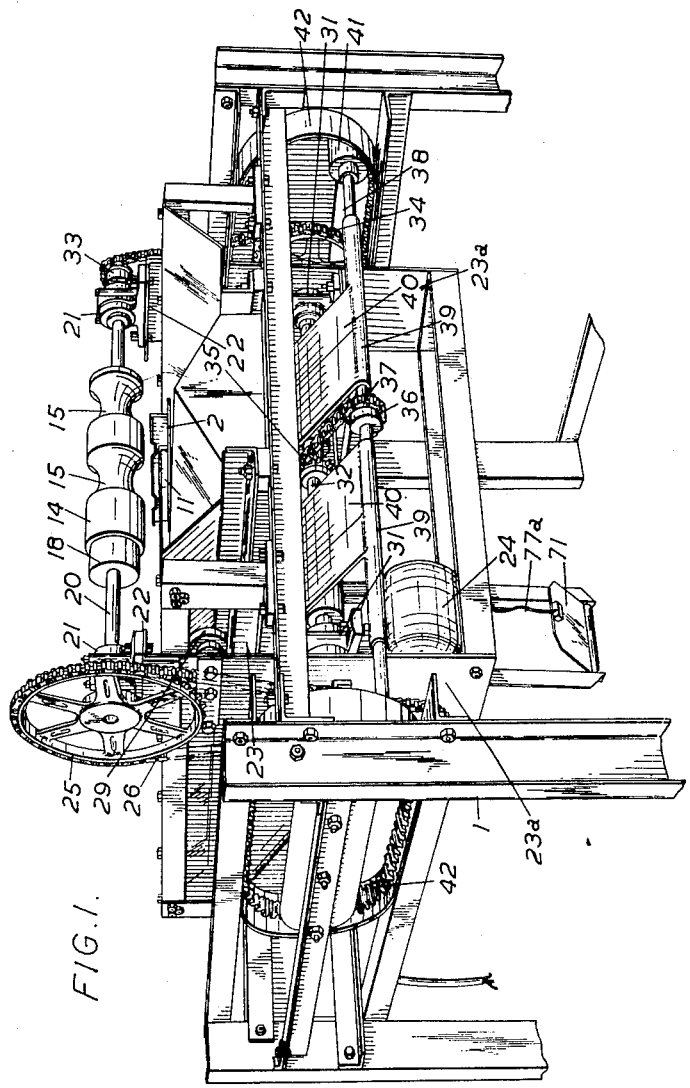

Feb. 19, 1952　　R. H. RICHARDSON ET AL　　2,586,714
MACHINE FOR MAKING ROOFING TILES
Filed Dec. 14, 1950　　8 Sheets-Sheet 1

Inventors
Ronald H. Richardson
Thomas H. Wilson
By

Feb. 19, 1952     R. H. RICHARDSON ET AL     2,586,714
MACHINE FOR MAKING ROOFING TILES
Filed Dec. 14, 1950     8 Sheets-Sheet 2

Inventors
Ronald H. Richardson
Thomas H. Wilson
By
Agt.

Inventors
Ronald H. Richardson
Thomas H. Wilson
By
Jerome W. Paxton
Agt.

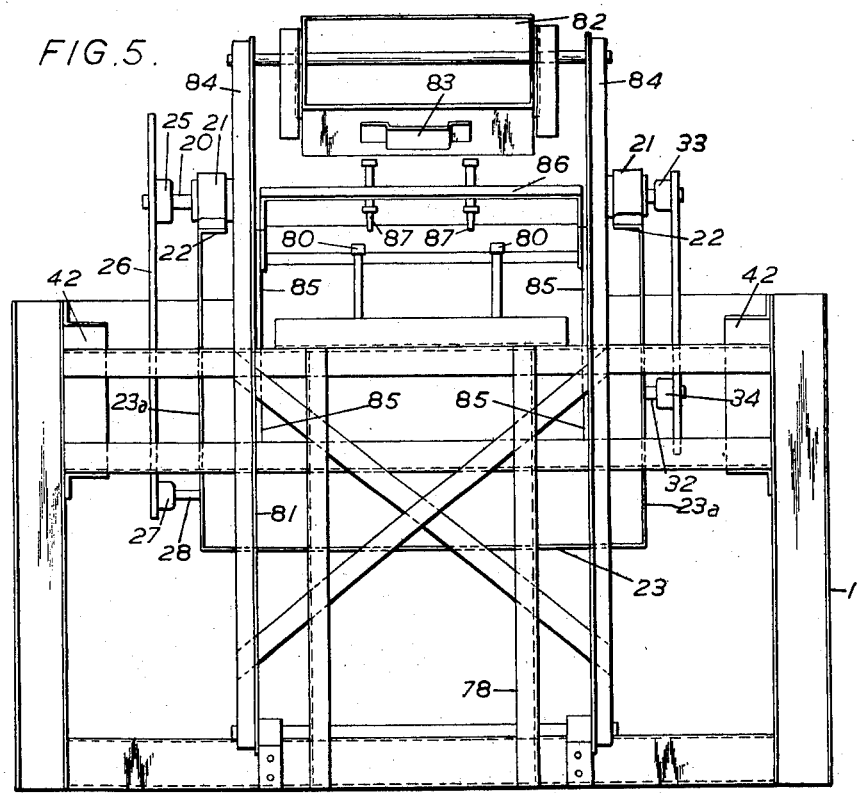
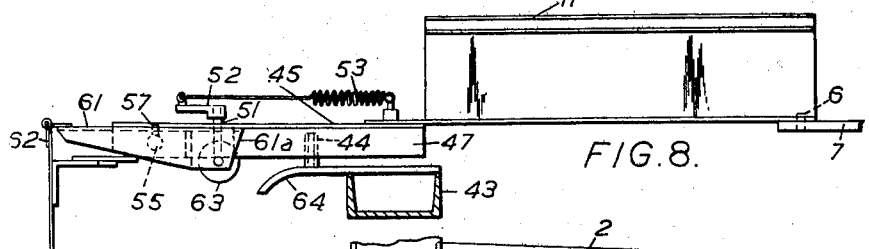
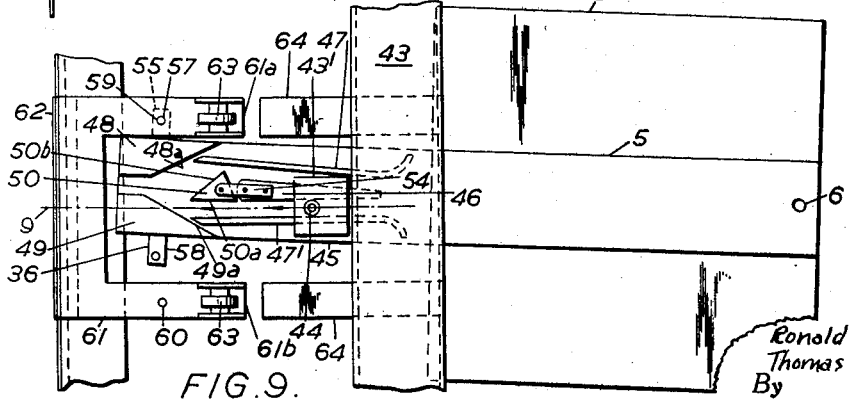

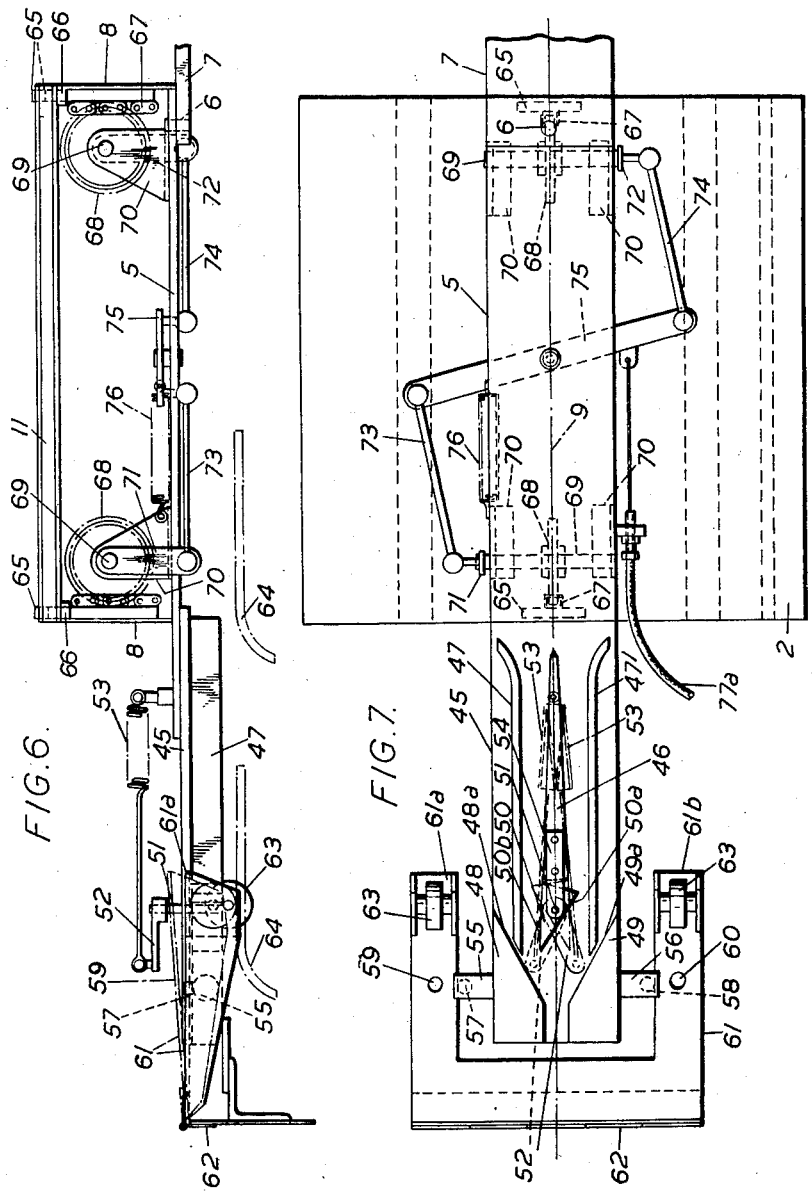

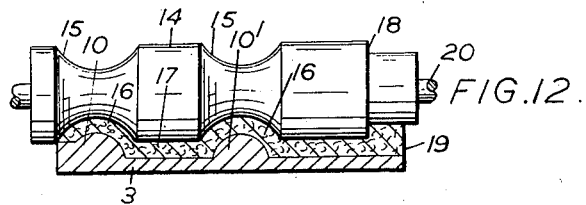
FIG.12.
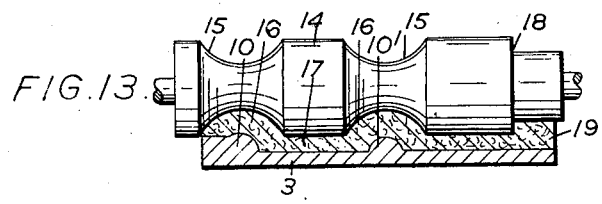
FIG.13.
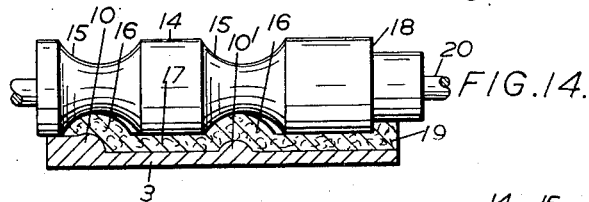
FIG.14.
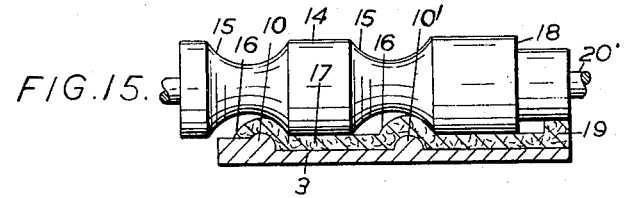
FIG.15.
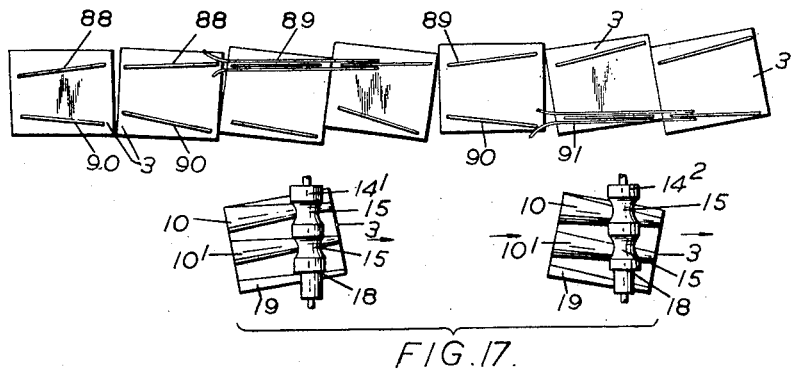
FIG.16.
FIG.17.
Inventors
Ronald H. Richardson
Thomas H. Wilson
By Feb. 19, 1952 R. H. RICHARDSON ET AL 2,586,714
MACHINE FOR MAKING ROOFING TILES
Filed Dec. 14, 1950 8 Sheets-Sheet 8

Inventors
Ronald H. Richardson
Thomas H. Wilson
By

Patented Feb. 19, 1952

2,586,714

UNITED STATES PATENT OFFICE 2,586,714

MACHINE FOR MAKING ROOFING TILES

Ronald Herbert Richardson, Hugglescote, and Thomas Harold Wilson, Coalville, England, assignors to Pegson Limited, Coalville, England, a British company Application December 14, 1950, Serial No. 200,776
In Great Britain December 16, 1949

18 Claims. (Cl. 25—43)

This invention relates to means for making roofing tiles of concrete, mortar or like cementitious material or of an earthen plastic such as clay (hereinafter for convenience referred to generically, in the following further description and in the appended claims, as "concrete"), and has for its object to provide what is believed to be a new machine for making a roofing tile of the kind having formed on its top surface at least one tapered rib.

The new machine envisaged by this invention is principally intended for use in the production of so-called double Roman tiles, that is to say roofing tiles having two laterally spaced tapered ribs of part-circular form in cross section. In a double Roman roofing tile the appropriately spaced tapered ribs extend from end to end of the tile, and the widest portions of the ribs, i. e. the portions having the largest radii, are at the lower end of the tile (regarding the latter in its sloping position of use), whereas the narrowest portions of the ribs having the smallest radii are at the upper end of the tile. Moreover, a tile of this particular type is customarily formed along one side with a tapered "lock" adapted, when the tile is laid, for interengagement with the tapered rib at the opposite side of an adjacent tile.

It is to be clearly understood, however, that the machine constituting this invention may be made in a form for producing tiles of the single Roman type, or any appropriate variation of a Roman tile having one, two or even more tapered rib formations.

Heretofore, roofing tiles of the kind concerned have usually been produced by hand. But due to the tapers and the varying radii on the top surfaces of such tiles it has, quite naturally, been difficult, if not impossible, to obtain a consistent form as between one tile and another.

The present invention accordingly has for its aim the provision of mechanical means for making Roman and similar roofing tiles, such means being designed to eliminate the human element and so produce an identical form on every tile made.

Broadly considered, the machine constituting this invention includes, in combination, a roller, strickle, vibrating bar or other shaping member profiled to conform substantially with the form of at least the ribbed portion of the top surface of a tile at the end thereof where the tapered rib is widest, means for the support of a pallet carrying concrete to be formed into the tile, and means for effecting relative movement both longitudinally and laterally between the said shaping member and a pallet. By "longitudinally" is meant in the direction of the length of a pallet, on the support, whereas by "laterally" is meant transversely of this lengthwise direction.

For the sake of convenience in the following further description and in the appended claims, the term "roller" will be used in a generic sense and is intended to include, where the context so admits, any other appropriate shaping member such as a strickle or vibrating bar as aforesaid.

It is within the scope of the invention to provide an intermittent machine adapted to function on a semi-automatic basis, as well as a wholly automatic machine designed to operate on the continuous feed principle.

Figure 2:
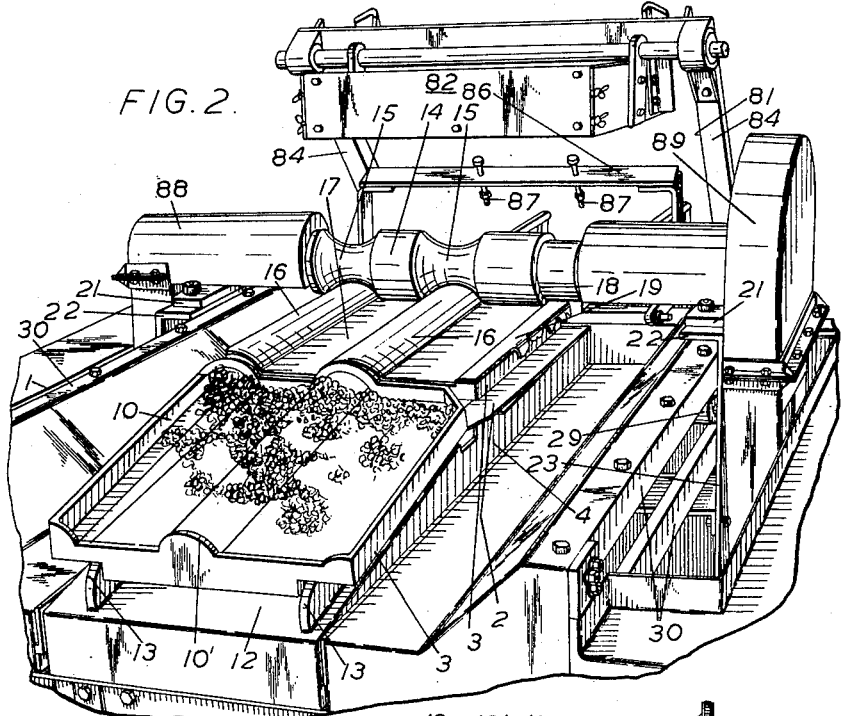
Figure 4:
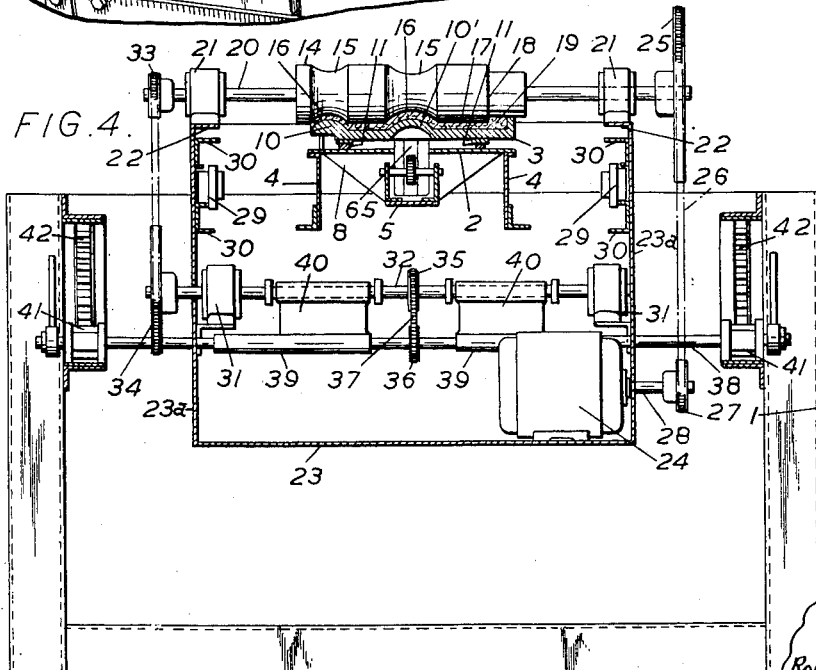
Figure 3:
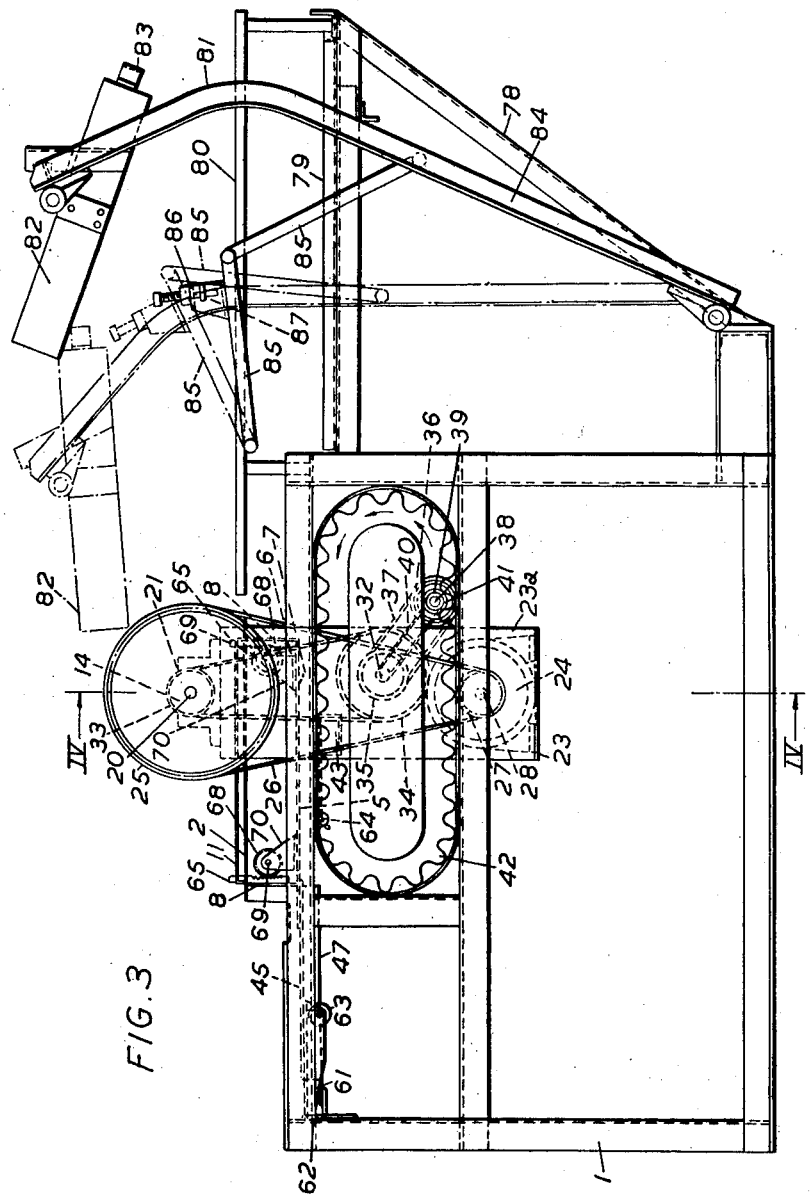

Specific constructional examples of tile-making machines constructed in accordance therewith will now be described with reference to the accompanying drawings, wherein, Figure 1 is a rear pictorial view of an intermittent machine adapted to function on a semi-automatic basis, the colour box and nail hole punch assembly being removed for clarity, Figure 2 is a pictorial view of the top part only of such machine, as seen from the front, and showing a pallet in position with a double Roman roofing tile in the course of being rolled and moulded, Figure 3 is a diagrammatic side view of the said machine, Figure 4 is a transverse sectional view of the same taken on the line IV—IV of Figure 3, Figure 5 is a rear view of the machine.

Figure 10:
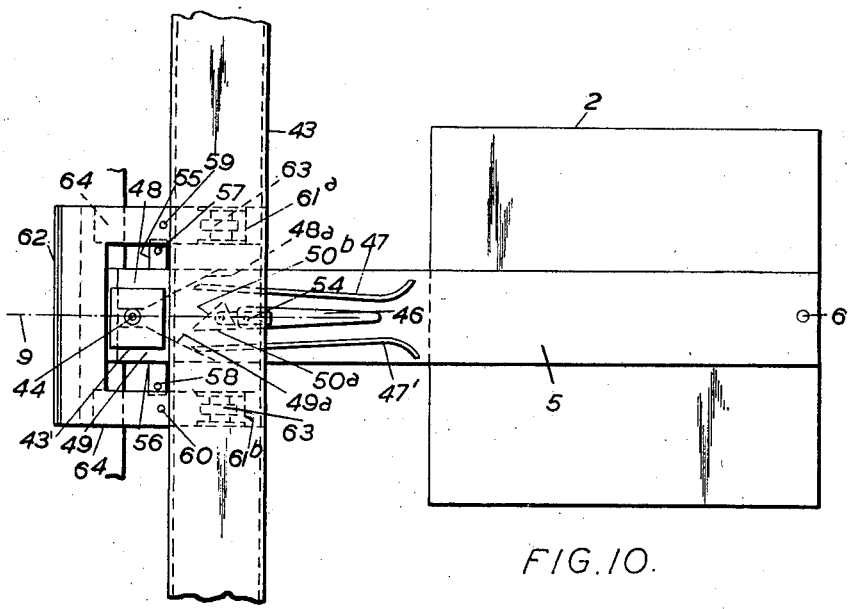
Figure 11:
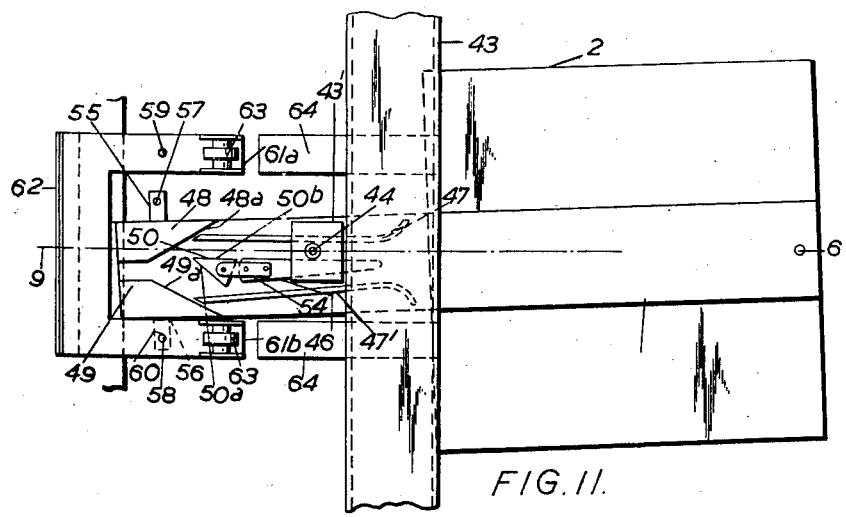
Figure 18:
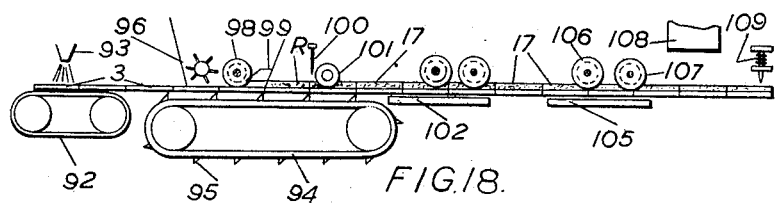
Figure 19:
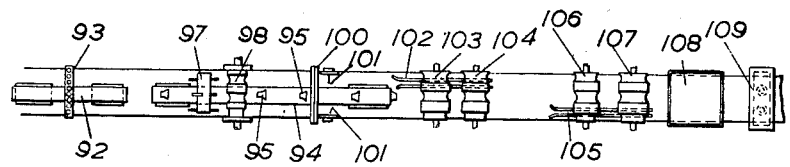
Figure 20:
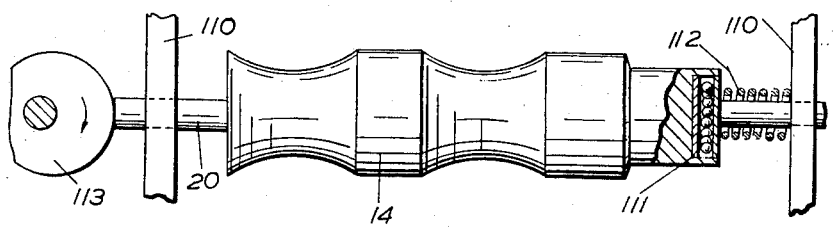

Figure 6 is a detail side elevational view, drawn to a larger scale than Figures 1-5, illustrating more clearly the pallet carrier plate and the means associated therewith both for locking a pallet against longitudinal movement during traverse of the form roller, and for shifting the carrier plate from side to side, Figure 7 is an underside plane view of the said pallet carrier plate and associated means, Figure 8 is a further side view (somewhat similar to, but omitting certain of the parts shown in Figure 6) illustrating more clearly the means for shifting the pallet carrier plate, Figure 9 is an inverted plan view corresponding to Figure 8, Figures 10 and 11 are two further inverted plan views similar to Figure 9 but showing respectively different stages in the shifting movements, Figures 12-15 are a series of detail cross-sectional views of a pallet, a double Roman roofing tile and a form roller showing various stages in the rolling and moulding of the tile, Figure 16 is an underside plan view of a stream of travelling pallets which are adapted to be shifted alternately to opposite sides of the straight line of pallet movement (beneath rotating form rollers provided at fixed locations), Figure 17 is a detail plan view of two of the pallets shown in Figure 16, Figure 18 is a diagrammatic side view of a wholly automatic machine for producing double Roman tiles on the continuous feed principle, Figure 19 is a plan view corresponding to Figure 18, and Figure 20 depicts a modification in which the form roller is axially movable alternately in opposite directions during traversal of the same back and forth.

Like parts are designated by similar reference characters throughout the drawings.

The tile-making machine illustrated in Figures 1–9 includes a main frame 1 fabricated of channel and angle irons. Mounted within this frame at the top thereof is a horizontally disposed rectangular carrier plate 2 for a pallet such as that indicated at 3 in Figure 2. The plate is itself supported upon laterally flanged uprights 4 secured upon the frame. Mounted beneath and rigid with the plate 2 is a horizontal platform 5 which, as shown in Figures 3 and 6, is pivoted at its rear end upon a vertical fulcrum pin 6 fixed in a part 7 on the main frame. In this way the plate 2, which is connected with the platform 5 by means of vertical webs 8, is enabled to be shifted from side to side and thereby turned at an angle to the longitudinal median line 9 (see Figure 7). The platform 5 is narrower in width than the pallet carrier plate 2, for which reason the side edges of the vertical webs 8 are upwardly divergent as illustrated in Figure 4. The upper surface of any pallet 3 used in this machine is formed to correspond with the shaping of the underside of the double Roman tile to be produced. Thus, the pallet has two laterally spaced and longitudinally tapered formations 10, 10' which, as will be seen from Figures 12–15, are of semi-circular form in cross-section. On the top of the plate 2 are provided two longitudinally extending parallel rails 11 for the support of a pallet. As shown in Figure 2, there may conveniently be provided in front of the pallet carrier plate 2 an upwardly inclined ramp 12 furnished with rails 13 along which a pallet can be pushed into position onto the rails 11 on the plate 2. The idea is that as and when each tile is finished it shall be withdrawn rearwardly from the plate 2, a fresh pallet, previously placed on the ramp 12, then being pushed up the latter onto the plate 2, and so on.

Mounted above the pallet carrier plate 2, with its axis disposed at right angles to the aforementioned longitudinal median line 9, is a form roller 14 having therein two circumferential concavely formed grooves 15 of a cross-sectional shape to conform with the external surfaces of the widest ends of the tapered ribs 16 of a double Roman roofing tile such as that indicated at 17 in Figures 2 and 4. At its right-hand end, as viewed from the front of the machine, the form roller 14 is reduced in diameter and thereby shouldered at 18 so as to be capable of moulding a tapered lock 19 along one side of the tile 17. The ends of the spindle 20 of the roller 14 are mounted for rotation in bearings 21 secured upon inwardly directed horizontal flanges 22 provided at the upper end of a form roller carriage 23. This carriage is traversible back and forth on the main frame and carries an electric motor 24 from which the roller 14 is continuously rotated. Thus, as will be seen in Figures 1, 3 and 4, the right-hand end of the roller spindle 20 (again as viewed from the front of the machine) has secured thereto a chain wheel 25 around which is passed an endless chain 26 engaged with a chain sprocket 27 on the motor spindle 28. The vertical sides 23a of the roller carriage 23 are fitted with rollers 29, shown more clearly in Figure 4, arranged to run between pairs of horizontal guides 30 of channel form fixed in the main frame. To enable the form roller 14 to be traversed back and forth over the plate 2, the carriage 23 is fitted with further bearings 31 in which is mounted for rotation a countershaft 32 adapted to be driven from the roller spindle 20 through the medium of a sprocket 33 secured upon the left-hand end of the said roller spindle, a chain wheel 34 secured upon the corresponding end of the countershaft 32 and an endless chain passed around this sprocket and wheel. Driven from the countershaft 32, through the medium of sprockets 35 and 36 and a relatively short chain 37, is a traverse drive shaft 38 which is mounted to rotate in elongated tubular bearings 39 carried by link plates 40 or arms capable of turning about the axis of the countershaft 32. Fixed to the opposite sides of the machine for co-operation with pinions 41 on the ends of the traverse drive shaft 38 are endless racks 42 each in the form of an elongated, internally toothed loop. One of such racks 42 is clearly illustrated in Figure 3. Thus, as the traverse drive shaft 38 rotates, the pinions 41 travel first forwardly in engagement with the upper runs of the racks 42 and then rearwardly in engagement with the lower runs of the racks, and so on, whereby the roller carriage is positively traversed back and forth.

As will be appreciated, the pallet carrier plate 2 is pivoted on its median line at a location corresponding with the end of a positioned pallet 3 where the tapered formations 10, 10' thereon are widest. In the specific example now being described, the pallet carrier plate 2, during traverse of the form roller 14 back and forth, is automatically shifted about the axis of the fulcrum pin 6 to divert a pallet alternately to opposite sides of the median line 9 and to an angular extent sufficient to impart the correct amount of taper to the moulded rib formations 16 on a tile. To this end, a cross-member 43 connecting the opposite depending sides 23a of the roller carriage 23 is fitted centrally between its ends, with a bracket 43' carrying a roller 44 disposed with its axis vertical, and this roller is adapted for co-operation with guides and cams mounted beneath a forward extension 45 of the pivoted platform 5 (see Figures 6–11). These guides and cams comprise a central fixed guide 46 of rearwardly tapering form, a pair of fixed guide rails 47 and 47[1] arranged at respectively opposite sides of the said central guide, two fixed shifting cams 48 and 49 with operative edges 48a and 49a obliquely disposed in opposite directions with respect to the median line 9, and, pivotally mounted at the forward end of the fixed central guide 46, adjacent to the fixed shifting cams, a triangularly shaped shifting cam 50 which, as seen in Figure 7, is movable from the full line position to the chain line position, and vice versa. The construction and arrangement are accordingly such that with the carrier plate 2 shifted to the right (viewing the machine from the front and as seen in Figure 9) and the roller carriage 23 moving forwards, the roller 44 will first travel forwardly between the central tapered guide 46 and the left-hand guide rail 47¹ until it comes into contact with the operative oblique edge 49a of the fixed shifting cam 49 whereupon as a consequence of continuing forward movement of the roller carriage the forwardly directed extension 45 of the platform 5, and hence also the pallet carrier plate 2, will be gradually turned to the central position depicted in Figure 10 coincident with the median line 9. When, upon reversal of the traverse of the roller carriage, the roller 44 commences to move rearwardly it will first make contact with the edge 50b of the pivoted shifting cam 50 with the result that the carrier plate 2 will be diverted to the required angular extent to the left-hand side of the median line 9 and the said shifting cam 50 will be tripped and turned to the position indicated in Figure 11. At the next reversal of the carriage traverse, the forwardly moving roller 44 will travel between the central guide 46 and the right-hand guide rail 47 until it comes into contact with the operative oblique edge 48a of the other fixed shifting cam 48 whereupon the carrier plate 2 will be turned once again into its central position. When, however, the traverse of the carriage is again reversed, the rearwardly moving roller 44 will first make contact with the edge 50a of the pivoted shifting cam 50 so that the carrier plate 2 will be diverted to a corresponding angular extent to the right-hand side of the median line and the cam 50 will be tripped and turned to its original position shown in Figure 9, and so on, these regular shifting movements of the plate 2 being suitably timed in relation to the forward and reverse traverses of the form roller. To ensure, as a safety measure, that the pivoted shifting cam 50, when tripped, shall positively move to and remain in the required position until next tripped and moved into its other position, and so on, the said cam is rigidly secured to a vertical spindle 51 which, as shown in Figure 6, extends up through the extension plate 45 and has attached thereto a lever 52 controlled by a tension spring 53. By reason of this construction whenever the cam 50 passes dead centre in either direction it snaps into the appropriate position and can only be diverted therefrom against the spring action. The spindle 51 is turnable within a bearing hole formed in a bar 54 screwed to the underside of the central guide 46.

It is important that whenever the pallet carrier plate 2 has been fully diverted to either side of the aforementioned median line it shall be securely locked until next required to be shifted back to its central position and from thence turned to the opposite side. Conveniently for this purpose there are secured in the outer sides of the fixed shifting cams 48 and 49 laterally directed elements 55 and 56 in which are fitted upstanding pins 57 and 58 respectively, these pins being adapted for projection one at a time through corresponding holes 59 and 60 formed in spaced arms 61a and 61b of a bifurcated locking plate 61 hinged at 62 to the front of the main frame 1. Beneath the free ends of the arms 61a and 61b are provided rollers 63 arranged for engagement by travelling cams 64 attached to the front of, and projecting forwardly from, the cross member 43 of the roller carriage 23. Each time the carriage moves forward, therefore, the travelling cams 64 act on the rollers 63 and thereby lift the locking plate 61 suchwise as to release the entire unit comprising the carrier plate 2, the platform 5 and the extension 45 thereof. After the unit has been diverted to the opposite side of the median line, and as the carriage commences to move backwards again, the cams 64 leave the rollers 63 with the result that the locking plate 61 falls and the pin 57 (or 58) is engaged in the hole 59 (or 60) in the arm 61a (or 61b) of the said plate, as the case may be, thereby locking the diverted carrier plate 2 until it is again released (to permit of diversion in the opposite direction) by upward movement of the locking plate 61 towards the termination of the next forward traverse of the roller carriage.

Now each time a pallet 3, loaded with concrete ready for rolling, is slid into position on the rails 11 of the carrier plate 2 it is necessary, or at least desirable positively to lock the pallet against longitudinal movement during traverse of the form roller 14. To enable this to be done there are provided at opposite ends of the carrier plate 2, adjacent to the inner sides of the webs 8 serving to connect the said plate 2 with the platform 5, two vertically slidable tongue-like bolts 65 the upper ends of which normally project up through openings in the carrier plate for engagement with lugs at the opposite ends of a pallet. These two bolts are, however, simultaneously withdrawable in a downward direction at the will of the attendant of the machine whenever it is desired to release, for withdrawal rearwardly, a pallet carrying a rolled and moulded tile. The bolts 65 must, of course, be held down in the withdrawn position until a fresh pallet has been slid into position on the carrier plate 2. Each of the two bolts 65 is slidable vertically through a guide 66 (Figure 6) and has attached thereto a short length 67 of roller chain with which is arranged to mesh a chain sprocket 68. The sprockets 68 are rigidly secured upon spindles 69 mounted to turn in brackets 70 secured upon the platform 5, i. e. beneath the pallet carrier plate 2. To the right-hand end of one of the chain sprocket spindles 69 is secured a depending arm 71 whilst to the opposite end of the other spindle 69 is similarly secured a depending arm 72, the lower ends of the two arms 71 and 72 being connected, through the medium of suitably articulated links 73 and 74, to the respectively opposite ends of a centrally fulcrumed two-armed lever 75. This lever is controlled by a tension spring 76 so arranged that the two bolts 65 are normally maintained in their operative positions with their upper ends projecting up through the plate 2. For turning the lever 75 against the action of the spring 76, and so effecting rotation of the sprockets 68 in opposite directions to withdraw the bolts 65, there is provided an actuating member, such as the treadle 77 (Figure 1) or a hand lever, which is connected to the lever 75 by means of a Bowden cable 77a (Figure 7).

As shown more clearly in Figures 3 and 5, there is provided at the back of the machine a structure 78 including a horizontal tray or rack 79 surmounted by a pair of parallel rails 80 for the temporary support of a pallet and tile withdrawn rearwardly from the carrier plate 2 after a rolling and tile-moulding operation. Associated with the structure 78 is a pivoted frame 81 in which is mounted a hand-operated colour box 82 incorporating a shaker device. The box is furnished with a handle 83. Connected to the side members 84 of the frame 81, by pairs of pivoted links 85, is a transverse bar 86 which bridges the rails 80 and has fitted therein two spring-influenced punches 87 adapted, upon appropriate movement of the frame 81, to form nail holes in a tile.

As depicted in Figure 2, the roller spindle bearings, the chain wheel 25 and the sprocket 33 are, in the completed machine, covered by casings 88 and 89.

If desired, the roller carriage 23 may be fitted with a pack knife.

To produce a tile on the semi-automatic machine just described, concrete is first placed on a pallet and, after the latter has been slid into position and locked upon the carrier plate 2, the roller carriage 23 is traversed back and forth as a consequence of which the pallet is automatically shifted first to one side and then the other so that the rotating form roller 14 rolls the concrete with tapered ribs. Nail holes are then punched in the tile by the punches 87 and colour is added to the surface of the tile as required by suitable operation of the colour box 82. The pallet and the tile are finally removed and placed in a rack to dry.

Figure 12 shows the relation of the roller 14 to the front or "lower" end of a pallet 3, with a tile 17 in the course of being rolled. Figure 13 similarly shows the relation of the roller to the rear or "upper" end of the pallet. In Figure 14, the pallet 3 has been shifted and offset to the left, and the roller 14 is shown forming the left-hand sides of the ribs 16 and the lock 19 on the tile. Figure 15 shows the pallet shifted and offset to the right to enable the roller to form the right-hand sides of the ribs 16.

In a simplified form of an intermittent machine the roller carriage may be adapted to be reciprocated by manual means. Moreover, the pallet carrier plate may be furnished with a handle by means of which an operator can manually shift and divert the pallet to either side. In such an arrangement a notched plate, or suitably arranged stops, may be provided to determine the positions to which the pallet can be moved. The carrier plate may alternatively be shifted from side to side by a foot treadle, or by any suitable means including a Bowden cable. When producing a tile on a machine equipped with manually operable pallet-shipping means, the roller carriage, with the pallet carrier in its central position, may be traversed back and forth so that the rotating form roller first rolls the concrete with parallel-sided ribs conforming with the profile of the roller, whereupon the pallet may be shifted first to one side and then the other so that the previously rolled parallel-sided ribs are tapered by the continuing action thereon of the roller.

As will be appreciated it may be necessary or desirable to provide in one and the same machine a plurality of form rollers, for example two or more suitably spaced single rollers, or groups of rollers, according to requirements. Consequently, a pallet may be moved continuously beneath successive form rollers, and, preparatory to the concrete on the pallet being rolled by one form roller, or group of such rollers, the pallet may be diverted from and to one side of its normal path into an oblique position by reason of engagement of one of two inclined bars, ribs or equivalent on the underside of the pallet with a corresponding relatively fixed straight guide at one side of the pallet table or support and then, before the concrete is rolled by the next roller or rollers, the pallet may be similarly diverted to the opposite side of its normal path by engagement of the other bar, rib or equivalent with a guide at the opposite side of the said table or support.

Thus, in a fully automatic machine successive pallets are moved forwards by mechanical means in a continuous stream, and, after concrete has been fed onto the pallets in the form of a ribbon, the pallets pass one by one beneath a rotating form roller which roughly forms the tiles with initially parallel-sided ribs. A pack knife arranged beyond this roller strickles and compresses the concrete. Thereafter, and as shown in Figure 16, an obliquely disposed diversion bar 88 on the underside of each pallet 3 engages in a straight relatively fixed shifting guide 89 by which each pallet in turn is diverted from its normal straight path by being caused to pivot about a point on its rear end (the end at which the tapers 10 on the pallet are widest). While in this position each pallet 3 passes beneath one or more further form rollers such as 14$^1$ (see Figure 17) whereby one side of each rib on the moulded tile on the pallet is inclined from the straight. The diversion bar 88 of each pallet in turn thereupon leaves the shifting guide 89, thereby freeing the pallet, to enable an oppositely inclined diversion bar 90 on the underside thereof to engage in another fixed shifting guide 91 so disposed as to effect diversion of each pallet in turn about its pivotal point to the opposite side of its normal straight path. Whilst in this further oblique position each successive pallet passes beneath a still further form roller or rollers such as 14$^2$ (Figure 17) whereby the other side of each rib on the corresponding tile is rolled out of the straight to complete the formation of the tapered ribs on the tile. Successive pallets then pass beneath suitable mechanism for automatically adding colour to, and punching nail holes in, the tile. If necessary, suitable trimmers may be fitted to the machine at convenient points to remove surplus concrete from the tiles.

A specific form of fully automatic machine is illustrated purely diagrammatically in Figures 18 and 19. As will be seen this comprises, in combination, and in their order of use, a feeder belt 92 for feeding pallets 3 one after another into the machine, means 93 above the said belt for initially spraying the fed pallets with oil, a driveable endless member 94 furnished at regular intervals therealong with projecting dogs 95 for engaging, and driving forward, the pallets 3 in a continuous stream; a mortar box 96 with an agitator 97 for feeding concrete in a continuous ribbon R onto the pallets as driven, a form roller 98 for initially rolling the ribbon, an adjacent pack knife 99 for strickling and compressing the ribbon, a parting knife 100 for cutting the ribbon transversely into separate tiles 17, rotary scrapers 101, a fixed guide 102 for shifting the pallets to one side of their normal straight path, further form rollers 103 and 104 for rolling one side of the tapered ribs, another fixed guide 105 for subsequently shifting successive pallets to the other side of their normal straight path, still further form rollers 106 and 107 for rolling the other side of the tapered ribs; a colour box 108 and a nail hole punch 109.

Each of the fixed pallet shifting guides may advantageously consist, as shown, of a pair of parallel spaced members arranged to provide between them a straight track to receive a diversion bar, the entrance to the track being flared.

Where, as hereinbefore mentioned, a form roller is adapted to be traversed axially first in one direction and then in the opposite direction, the ends of the roller spindle are, as shown in Figure 20, mounted in supports 110 on the roller carriage, one end of the roller being fitted with a thrust race 111 between which and the opposing support is interposed a compression spring 112, whilst an appropriately profiled rotary cam 118 is provided for action on the spindle 20 at the opposite end of the roller.

What we claim is:

1. A machine for making a roofing tile having at least one longitudinally extending tapered rib, said machine including, in combination, a shaping member profiled to conform substantially with the form of at least the ribbed portion of the top surface of a tile at the end thereof where the tapered rib is widest, means for the support of a pallet carrying concrete to be formed into the tile, and means for effecting relative movement both longitudinally and laterally between the said shaping member and a pallet.

2. A machine for making a roofing tile having at least one longitudinally extending tapered rib, said machine comprising, in combination, means for supporting a pallet carrying concrete to be formed into a tile, a shaping member having therein a concavely formed groove of a cross-sectional shape to conform with the external surface of the tapered rib at its widest end, and means for effecting relative movement both longitudinally and laterally between the said shaping member and a pallet.

3. A machine for making a roofing tile having two spaced tapered ribs and a tapered lock along one side, said machine comprising, in combination, means for supporting a pallet carrying concrete to be formed into a tile, a shaping member having therein two shaped grooves of a cross-sectional shape to conform with the external surfaces of the tapered ribs at their widest ends, one end of the said member being shouldered and thereby adapted to mould a tapered lock as aforesaid, and means for effecting relative movement both longitudinally and laterally between the said shaping member and a pallet.

4. A machine for making a roofing tile having at least one longitudinally extending tapered rib, said machine comprising, in combination, a support for a pallet formed on its upper surface to correspond with the shaping of the underside of the tile to be produced, a roller profiled in conformity with the form of the top surface of a tile at the end thereof where the tapered rib is widest, a carriage in which the said roller is mounted, this carriage being traversible back and forth in a straight path over the pallet support, means for rotating the roller within the carriage, and means for causing the pallet support to be turned aside first in one direction and then in the opposite direction into an oblique position with respect to the aforesaid straight path.

5. A machine for making a roofing tile having at least one longitudinally extending tapered rib, said machine comprising, in combination, a support for a pallet formed on its upper surface to correspond with the shaping of the underside of the tile to be produced, a roller arranged to rotate about a fixed axis and profiled in conformity with the form of the top surface of a tile at the end thereof where the tapered rib is widest, means for rotating the said roller about its fixed axis, means for moving a pallet in a straight path beneath the roller, and further means for causing the pallet, when so moved, to be turned first to one side and then the other into an oblique position with respect to the aforesaid straight path.

6. A machine for making a roofing tile having at least one longitudinally extending tapered rib, said machine comprising, in combination, a stationary support for a pallet formed on its upper surface to correspond with the shaping of the underside of the tile to be produced, a roller profiled in conformity with the form of the top surface of a tile at the end thereof where the tapered rib is widest, a carriage in which the said roller is mounted, this carriage being traversible to move the roller back and forth athwart its axis in a straight path over the stationary pallet support, means for rotating the roller within the carriage, and means for moving the roller axially within the carriage first in one direction and then in the opposite direction, for the purpose herein set forth.

7. A machine for making a roofing tile having at least one longitudinally extending tapered rib, said machine comprising, in combination, a support for a pallet, which latter is provided on the underside with two oppositely inclined spaced bars, a roller arranged to rotate about a fixed axis and profiled in conformity with the form of the top surface of the tile at the end thereof where the tapered rib is widest, means for rotating the said roller, means for moving a pallet in a straight path beneath the roller, and, disposed at opposite sides of the pallet support, longitudinally spaced parallel guides for co-operation with the oppositely inclined bars on the pallet for the purpose of turning the latter, when it is moved beneath the roller, first to one side and then the other into an oblique position with respect to the aforesaid straight path.

8. A tile making machine for making a roofing tile having at least one longitudinally extending tapered rib, said machine comprising, in combination, a support for a pallet which is provided on the underside with two oppositely inclined spaced bars, a plurality of spaced rollers mounted above the pallet support, each of the said rollers being arranged to rotate about a fixed axis and profiled in conformity with the form of the top surface of the tile at the end thereof where the tapered rib is widest, means for moving a pallet continuously in a straight line beneath successive rollers, and, disposed at opposite sides of the pallet support, longitudinally spaced fixed parallel guides for co-operation with the oppositely inclined bars on the pallet whereby the latter, preparatory to passing beneath one roller, is diverted from and to one side of its normal path into an oblique position by reason of the engagement of one of the two inclined bars on the pallet with a fixed guide at one side of the pallet support and then, before passing beneath the next roller, the pallet is similarly diverted to the opposite side of its normal path by engagement of the other bar on the pallet with a fixed guide at the opposite side of the said support.

9. A machine for making a roofing tile having at least one longitudinally extending tapered rib, said machine comprising, in combination, a main fixed frame, a support on said frame for a pallet, a roller profiled in conformity with the form of the top surface of a tile at the end thereof where the tapered rib is widest, a carriage in which the said roller is mounted, this carriage being traversible back and forth in a straight path over the pallet support, an electric motor mounted on the said carriage, means for transmitting the drive from the motor to the roller, a countershaft which is mounted in the roller carriage and also driven from the motor, a traverse drive shaft from which the carriage derives its movements back and forth, gearing between the said countershaft and the traverse drive shaft, link plates which are mounted to turn about the axis of the countershaft and are provided with bearings in which the traverse drive shaft is rotatable, pinions on said last mentioned shaft, endless racks fixed on the frame and with which the said pinions are engaged so that as the traverse drive shaft rotates the pinions travel first forwardly in engagement with upper runs of the racks and then rearwardly in engagement with lower runs of the same, and so on, and means for causing the pallet support to be turned aside first in one direction and then in the opposite direction into an oblique position with respect to the aforesaid straight path.

10. A tile making machine according to claim 9, wherein the pinions are secured upon the ends of the traverse drive shaft and are engaged with endless racks in the form of elongated internally toothed loops secured at opposite sides of the fixed frame.

11. A machine for making a roofing tile having at least one longitudinally extending tapered rib, said machine comprising, in combination, a main fixed frame, a carrier plate on the said frame for a pallet having on its upper surface a tapered formation corresponding with the shaping of the underside of the tile to be produced, the said carrier plate being mounted to turn upon the frame about an axis coincident with its median line at a location corresponding with the end of a supported pallet where the tapered formation thereon is widest, a roller profiled in conformity with the form of the top surface of a tile at the end thereof where the tapered rib is widest, a carriage in which the said roller is mounted, an electric motor mounted on the said carriage, means for transmitting the drive from the motor to the roller, means also driven from the motor and co-operable with fixed racks on the frame for traversing the carriage back and forth in a straight path over the pallet carrier plate, and means associated with the said plate for shifting it to either side to the required angular extent about the aforesaid axis, for the purpose herein described.

12. A machine for making a roofing tile having at least one longitudinally extending tapered rib, said machine comprising, in combination, a main fixed frame, a carrier plate on the said frame for a pallet having on its upper surface a tapered formation corresponding with the shaping of the underside of the tile to be produced, a platform upon which the pallet carrier plate is mounted, the said platform being arranged to turn, together with the plate, about a pivotal axis coincident with the median line of the plate at a location corresponding with the end of a supported pallet where the tapered formation thereon is widest, a roller profiled in conformity with the form of the top surface of a tile at the end thereof where the tapered rib is widest, a carriage in which the said roller is mounted, an electric motor mounted on the said carriage, means for transmitting the drive from the motor to the roller, means also driven from the motor and co-operable with fixed racks on the frame for traversing the carriage back and forth in a straight path over the pallet carrier plate, a part on the roller carriage, and, on the aforesaid platform, guide and cam means for co-operation with the said part whereby as the carriage is traversed back and forth the carrier plate is automatically turned alternately to opposite sides to the required angular extent about the aforesaid axis for the purpose herein described.

13. A tile making machine according to claim 12, wherein the said guide and cam means comprise a central fixed guide, a pair of fixed guide rails arranged at respectively opposite sides of the said central guide, two shifting cams fixed at the forward end of the pivoted platform and having operative edges obliquely disposed in opposite directions with respect to the median line of the said platform, and, pivotally mounted at the leading end of the fixed central guide, adjacent to the fixed shifting cams, a triangularly shaped pivoted shifting cam adapted to be acted upon and turned from one position to another by the part on the roller carriage each time the latter makes a rearward traverse, substantially as and for the purpose herein described.

14. A machine for making a roofing tile having at least one longitudinally extending tapered rib, said machine comprising, in combination, a main fixed frame, a carrier plate on the said frame for a pallet having on its upper surface a tapered formation corresponding with the shaping of the underside of the tile to be produced, a platform upon which the pallet carrier plate is mounted, the said platform being arranged to turn, together with the plate, about a pivotal axis coincident with the median line of the plate at a location corresponding with the end of a supported pallet where the tapered formation thereon is widest, a roller profiled in conformity with the form of the top surface of a tile at the end thereof where the tapered rib is widest, a carriage in which the said roller is mounted, an electric motor mounted on the said carriage, means for transmitting the drive from the motor to the roller, means also driven from the motor and co-operable with the fixed racks on the frame for traversing the carriage back and forth in a straight path over the pallet carrier plate, a part on the roller carriage, guide and cam means on the aforesaid platform for cooperation with the said part whereby as the carriage is traversed back and forth the carrier plate is automatically turned alternately to opposite sides to the required angular extent about the aforesaid axis and means for automatically locking the pallet carrier plate whenever it has been diverted to either side of its central position and for automatically effecting release of the said plate when next required to be turned to the opposite side of this position.

15. A tile making machine according to claim 14, wherein there is provided a movable locking plate adapted for co-operation with elements associated with the pivoted platform, movements of the locking plate into and out of engagement with the said elements to lock and effect release of the pallet carrier plate being effected and controlled by cams travelling with the roller carriage.

16. A machine for making a roofing tile having at least one longitudinally extending tapered rib, said machine comprising, in combination, a support for a pallet, formed on its upper surface to correspond with the shaping of the underside of the tile to be produced, a roller profiled in conformity with the form of the top surface of a tile at the end thereof where the tapered rib is widest, a carriage in which the said roller is mounted, this carriage being traversible back and forth in a straight path over the pallet support, means for rotating the roller within the carriage, means for causing the pallet support to be turned aside first in one direction and then in the opposite direction into an oblique position with respect to the aforesaid straight path, and means for locking in position and preventing longitudinal movement of a pallet placed upon the pallet support.

17. A tile making machine according to claim 16, wherein the locking means consist of bolts arranged normally to project through the said support for locking engagement with the pallet, withdrawal of these bolts from and projection thereof into their operative positions being effectible by rack and pinion means operable through the medium of spring-influenced connections.

18. A tile making machine for making roofing tiles each having at least one longitudinally extending tapered rib, said machine comprising, in combination, a support for pallets each of which is provided on the underside with two oppositely inclined spaced bars, means for moving forward on the support successive pallets in a continuous stream, means for feeding concrete in ribbon form onto the pallets, a plurality of spaced rollers mounted above the pallet support, each of the said rollers being arranged to rotate about a fixed axis and profiled in conformity with the form of the top surface of a tile at the end thereof where the tapered rib is widest, means for rotating the rollers, longitudinally spaced fixed parallel guides disposed at opposite sides of the pallet support for co-operation with the oppositely inclined bars on each pallet whereby the latter, preparatory to passing beneath one roller, is diverted from and to one side of its normal path into an oblique position by reason of the engagement of one of the two inclined bars on the pallet with a fixed guide at one side of the pallet support and then, before passing beneath the next roller, the pallet is similarly diverted to the opposite side of its normal path by engagement of the other bar on the pallet with a fixed guide at the opposite side of the said support, and, in advance of the fixed guides and the associated rollers, a form roller for roughly forming the tiles with initially parallel-sided ribs.

RONALD HERBERT RICHARDSON.
THOMAS HAROLD WILSON.

REFERENCES CITED

The following references are of record in the file of this patent:

FOREIGN PATENTS

| Number | Country | Date |
| --- | --- | --- |
| 360,313 | Germany | Oct. 2, 1922 |